United States Patent [19]
Piazza

[11] 4,014,159
[45] Mar. 29, 1977

[54] SPRING BRACKET FOR LAWN MOWER GRASS CATCHER

[76] Inventor: Charles J. Piazza, 6 Elizabeth Place, Wallington, N.J. 07057

[22] Filed: Mar. 17, 1976

[21] Appl. No.: 667,614

[52] U.S. Cl. ............................................. 56/202
[51] Int. Cl.² ....................................... A01D 35/22
[58] Field of Search ..................... 56/202, 194, 199

[56] References Cited
UNITED STATES PATENTS 3,820,313   6/1974   Hoffman ............................. 56/202

*Primary Examiner*—J.N. Eskovitz
*Attorney, Agent, or Firm*—Silverman and Jackson

[57] ABSTRACT

The present invention disclosed a spring bracket for securing a lawn mower grass catcher assembly to the base of a lawn mower proper in which the catcher assembly includes a loop element extending as an integral part of said assembly, wherein said spring bracket comprises: a handle having a notch-like recess therein, said recess adapted for a three-sided slide-fittable inclusion about said loop element; tension means having two ends, one of said ends being affixed to said handle at a point proximate to said recess; and a nut and bolt combination, said bolt secured to the second end of said tension means wherein said nut and bolt combination is itself secured to the base of the lawn mower proper, wherein a rotational movement of the handle will result in a selectable decrease or increase in said tension means which may be utilized in order to accomplish attachments of the present bracket to said loop element of the grass catcher assembly.

1 Claim, 3 Drawing Figures

SPRING BRACKET FOR LAWN MOWER GRASS CATCHER

BACKGROUND OF THE INVENTION

A persistant and long-standing problem in the use of grass catchers for lawn mowers has been that the grass catcher, regardless of its design, has proved difficult to maintain in a secured fashion to the base of the lawn mower proper.

Representative grass catcher assemblies to which the present problem has applied include U.S. Pat. No. 3,820,313, (1974) to Hoffman and U.S. Pat. No. 3,611,685 (1971) to Allina. While said patents include attempts at appropriately securing the grass catcher assembly to the base of a lawn mower, said attempts have, in natural usage, proved to be less than fully successful.

Accordingly, the present invention can be viewed as an effort to fill a need which has long existed for an appropriate attachment means of the grass catcher assembly to the base of the lawn mower proper.

SUMMARY OF THE INVENTION

The present invention discloses a spring bracket for securing a lawn mower grass catcher assembly to the base of a lawn mower proper in which the catcher assembly includes a loop element extending as an integral part of said assembly, wherein said spring bracket comprises: a handle having a notch-like recess therein, said recess adapted for a three-sided slide-fittable inclusion about said loop element; tension means having two ends, one of said ends being affixed to said handle at a point proximate to said recess; and a nut and bolt combination, said bolt secured to the second end of said tension means wherein said nut and bolt combination is itself secured to the base of the lawn mower proper, wherein a rotational movement of the handle will result in a selectable decrease or increase in the degree of tension of said tension means utilized in order to accomplish attachments of the present bracket to said loop element.

It is an object of the present invention to provide a means for securement of a lawn mower grass catcher to the base of a lawn mower proper.

It is another object to provide a spring bracket assembly having particular adaptation for securement of a catcher bag framing means to a base area of a lawn mower proper.

It is a further object of the present invention to provide a spring bracket securement means particularly adapted to attachment to the loop portion of a grass catcher assembly.

DETAILED DESCRIPTION OF THE INVENTION

Figure 1:
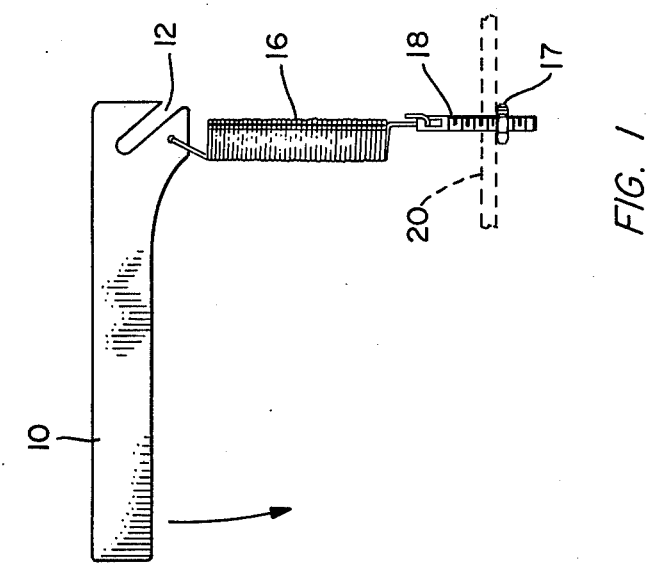
FIG. 1 is a front perspective view of the present inventive spring bracket assembly.

Shown in FIG. 1 of the drawings is the present inventive spring bracket. Said bracket comprises a handle 10 having therein a notch-like recess 12 which is adapted for a three-sided slide-fittable inclusion about loop element 13 of a grass catcher assembly 15. Further included in the present bracket is a tension means or spring 16, one end of which is affixed to said handle 10 at a point proximate to said recess 12.

Figure 2:
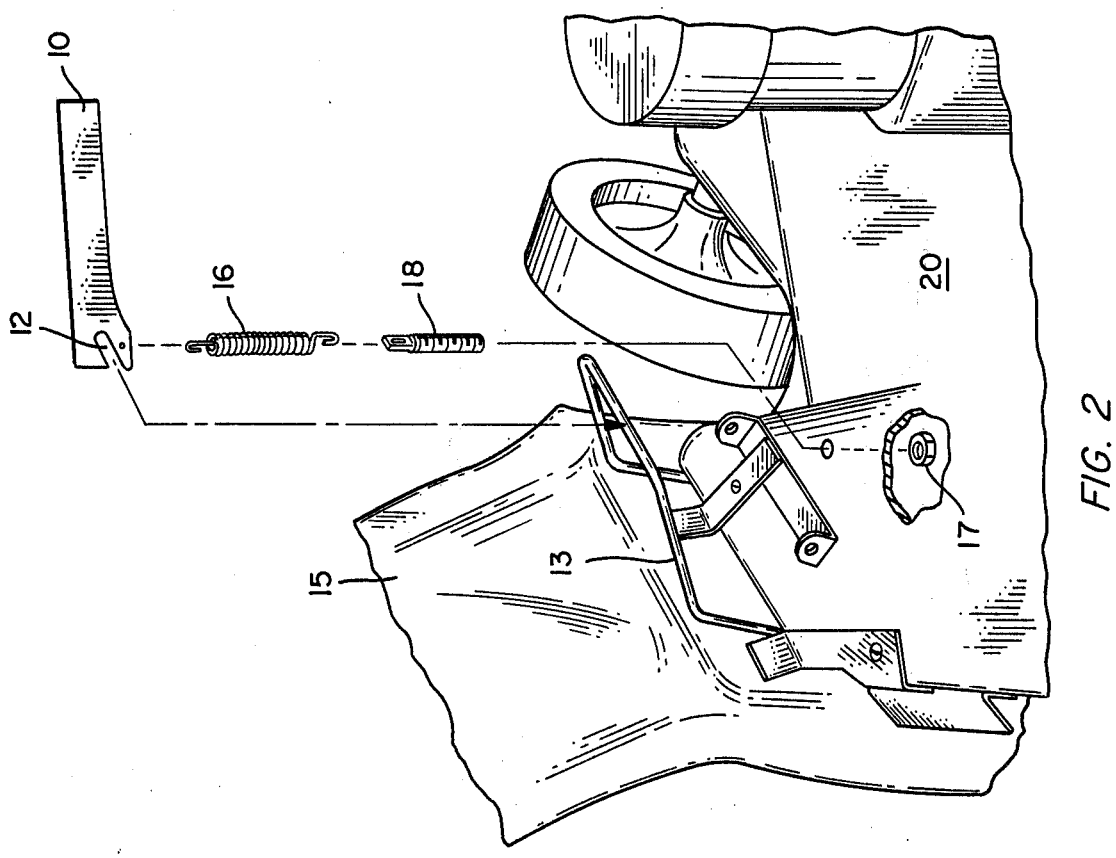
FIG. 2 is an exploded view of the spring bracket assembly in relationship to the loop element of the grass catcher and the base of the lawn mower.
Figure 3:
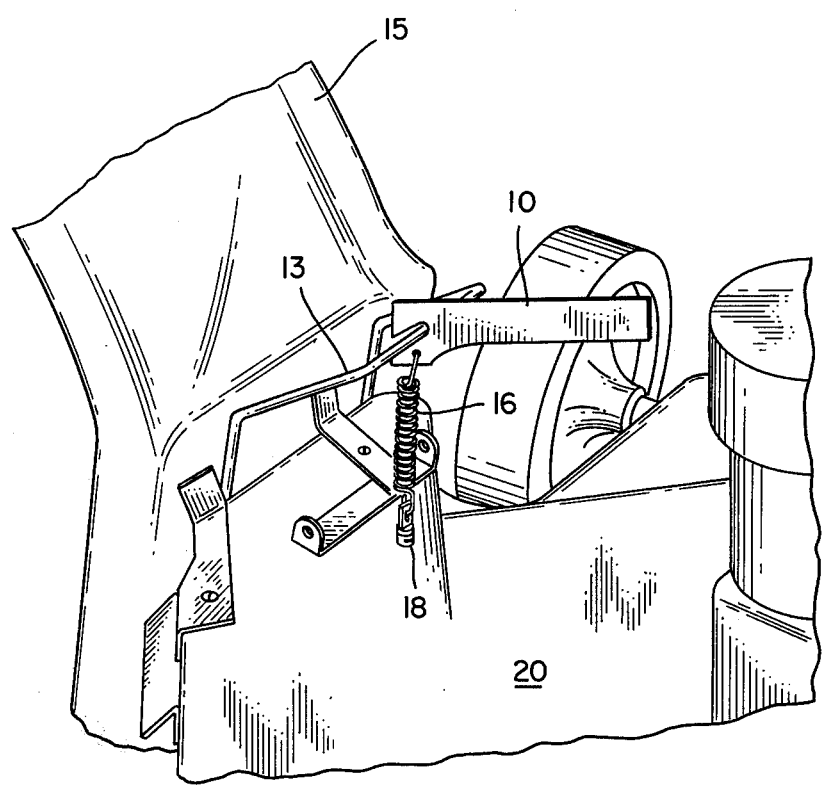
FIG. 3 is a perspective view of the present spring bracket in assembled and installed relationship with respect to the loop element and the base of the lawn mower.

The invention further comprises a nut 17 and bolt 18 combination wherein said bolt 18 is secured to the second end of said spring 16. The nut and bolt combination is itself secured to the base 20 of the lawn mower proper. An exploded view of the above-described elements appears in FIG. 2. An assembled view of the elements appears in FIG. 3. In said Figure it may be appreciated that a rotational movement of the handle 10 will result in a selectable decrease or increase in the force of the spring 16. This force can be utilized in order to accomplish attachments of the present bracket to said loop element 13 of the grass catcher assembly 15. It is to be noted that the tension of spring 16 serves to pull the loop 13 downward in the direction of the lawn mower base 20. This continuous application of tension has been found to be sufficient to maintain the catcher assembly in a proper state of securement with respect to the base of the lawn mower.

Where on desires to detach the catcher assembly, the handle 10 is simply rotated upward in a counter-clockwise direction.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described my invention, what I claim as new, useful and non-obvious and accordingly secure by Letters Patent of the United States is:

1. A spring bracket for securing a lawn mower grass catcher assembly to the base of a lawn mower proper in which the catcher assembly includes a loop element extending as an integral part of said assembly, wherein spring bracket comprises:
   a. a handle having a notch-like recess therein, said recess adapted for three-sided slide-fittable inclusion about said loop element;
   b. tension means having two ends, one of said ends being affixed to said handle at a point proximate to said recess; and
   c. a nut and bolt combination, said bolt being secured to the second end of said tension means in which said nut and bolt combination is itself secured to the base of the lawn mower proper,
   wherein a rotational movement of the handle will result in a selectable decrease or increase in the force of said tension means which changes may be utilized in order to accomplish respective attachments of the present bracket to said loop element of said grass catcher assembly.

* * * * *